(12) United States Patent
Dickinson et al.

(10) Patent No.: US 9,602,330 B1
(45) Date of Patent: Mar. 21, 2017

(54) TWO-STAGE TCP HANDSHAKE

(71) Applicant: Amazon Technologies, Inc., Reno, NV (US)

(72) Inventors: Andrew Bruce Dickinson, Seattle, WA (US); Kirk Arlo Petersen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 790 days.

(21) Appl. No.: 13/901,367

(22) Filed: May 23, 2013

(51) Int. Cl.
*G06F 15/16* (2006.01)
*H04L 29/06* (2006.01)
*H04L 29/08* (2006.01)

(52) U.S. Cl.
CPC .... *H04L 29/06095* (2013.01); *H04L 63/1458* (2013.01); *H04L 67/14* (2013.01); *H04L 69/16* (2013.01); *H04L 69/163* (2013.01)

(58) Field of Classification Search
None
See application file for complete search history.

(56) References Cited

U.S. PATENT DOCUMENTS

| | | | | |
|---|---|---|---|---|
| 2001/0042200 A1* | 11/2001 | Lamberton | ........... | H04L 63/126 713/151 |
| 2003/0108042 A1* | 6/2003 | Skillicorn | ........... | H04L 47/10 370/389 |
| 2003/0135625 A1* | 7/2003 | Fontes | ........... | H04L 63/12 709/228 |
| 2004/0008681 A1* | 1/2004 | Govindarajan | ........ | H04L 29/06 370/394 |
| 2008/0052402 A1* | 2/2008 | Carlinet | ........... | H04L 63/1458 709/229 |
| 2008/0229415 A1* | 9/2008 | Kapoor | ........... | G06F 21/55 726/22 |
| 2010/0228867 A1* | 9/2010 | Lam | ........... | H04L 63/0254 709/228 |
| 2012/0036231 A1* | 2/2012 | Thakur | ........... | H04L 45/00 709/220 |
| 2014/0286358 A1* | 9/2014 | Mahvi | ........... | H04L 1/0045 370/509 |

* cited by examiner

*Primary Examiner* — Thomas Dailey
(74) *Attorney, Agent, or Firm* — Baker & Hostetler LLP

(57) ABSTRACT

Techniques are disclosed for dividing a TCP handshake into multiple parts, in a system comprising an edge device, an intermediary computing node, and a destination computing node. A client sends a TCP SYN packet to the edge device, to establish a TCP connection with the destination computing node. The edge device performs the handshake, and then forwards an ACK packet to the intermediary computing node. The intermediary computing node uses that ACK packet to generate a second SYN packet, and uses that SYN packet to perform a TCP handshake with the destination computing node. Then, TCP sequence numbers are converted between what is expected by the client and destination in packets sent between the two.

22 Claims, 10 Drawing Sheets

TWO-STAGE TCP HANDSHAKE

BACKGROUND

Providing defense mechanisms against computer hackers and attacks on computing infrastructure has been an increasingly significant concern with the growing importance of network-based computing. With the growth of network-based computing over the Internet and the growing reliance on commercial network-based computing services, protecting computers and servers connected to a network from malicious network-based attacks has become a significant issue for businesses and organizations. For example, hackers may attack a computing service over a network using denial-of-service (DOS) attacks. SYN flooding is a type of a DOS attack. In a SYN flood attack, an attacker sends a large number of SYN (synchronize) packets to a target system in an attempt to overload the target system's resources so that the target is unable to respond to legitimate SYN packets, and other legitimate requests. Computing service providers must account for and protect against such attacks while maintaining an effective level of service to their customers.

DETAILED DESCRIPTION

Figure 4:
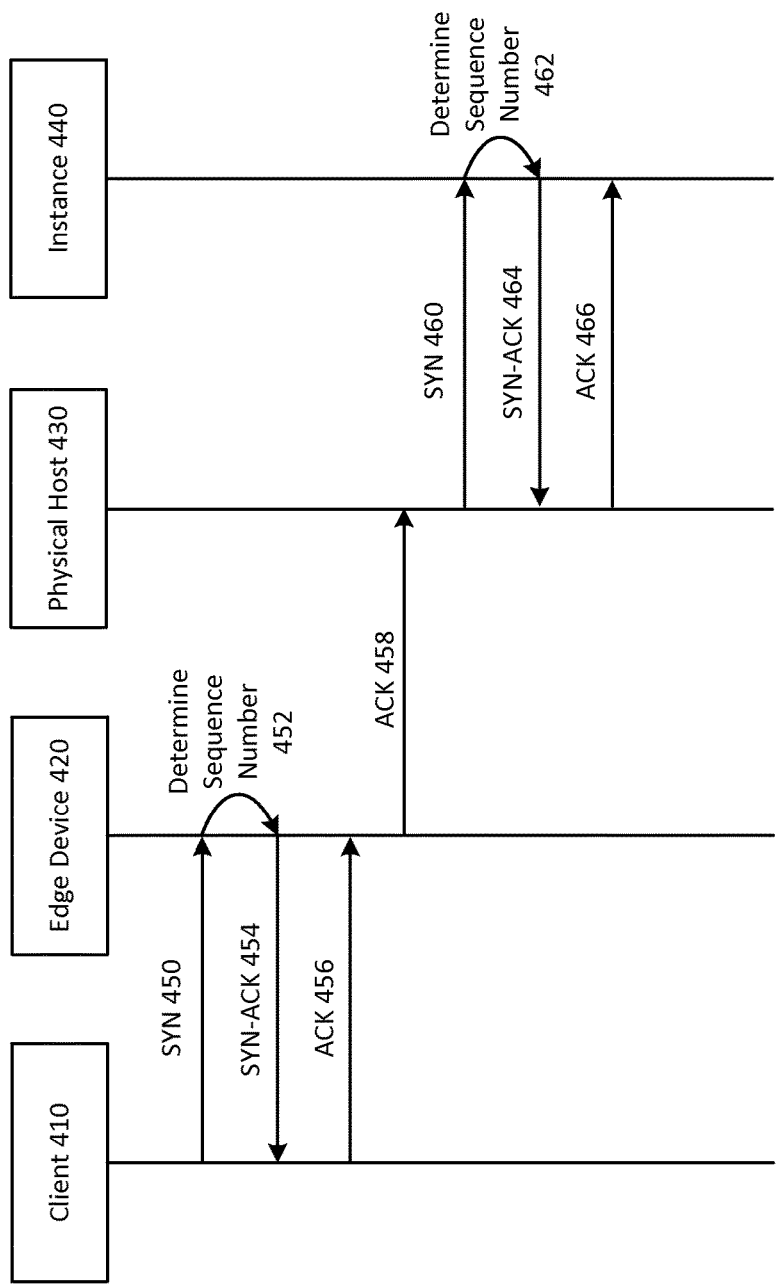
FIG. 4 depicts a communication flow for an example TCP handshake according to embodiments.

One technique to mitigate the effects of a SYN flood attack involves separating a TCP handshake across multiple entities (as depicted, for example, in FIG. 4). Consider an example scenario where a datacenter comprises a router (sometimes referred to as a gateway), an intermediary server, and a destination computing node (that is the destination for TCP connection requests that may be the target of a SYN flood attack). in this example, the router may be the first point of contact for outside computing nodes that are attempting to establish a TCP connection request with the destination computing node. The router may be configured to receive a high rate of TCP SYN packets and send responsive TCP SYN-ACK packets. After the router determines that a request for a TCP handshake originated from an actual outside computing node, and therefore unlikely to be participating in a SYN flood attack by sending an TCP ACK packet to the router, the router may then cause the destination computing node to complete a TCP handshake to establish a connection with the outside computing node. In this way, the destination computing node may be protected from receiving illegitimate SYN packets that are part of a SYN flood attack.

As stated above, when the router receives an ACK packet from an outside computing node (referred to herein as a source computing node), the router may then cause the destination computing node to complete a TCP handshake to establish a connection. For example, the router may forward this ACK packet to an intermediary computing node (where the destination computing node is a virtual machine instance, the intermediary computing node may be a physical host upon which the virtual machine instance executes). This intermediary computing node may use the ACK packet to generate a second SYN packet to send to the destination computing node. For example, the intermediary computing node may generate the second SYN packet to identify the source of the SYN packet as the source computing node. The intermediary computing node may determine an IP address for the source computing node based on the ACK packet that it receives from the router. The intermediary computing node may then send this second SYN packet to the destination computing node to initiate another TCP handshake (which also involves another SYN-ACK packet and another ACK packet). Once this second TCP handshake has been established (the first TCP handshake being between the source computing node and the router, and the second TCP handshake being between the intermediary computing node and the destination computing node), the source computing node and the destination computing node may communicate via the established TCP connection.

As described above, there may be two handshakes involved in creating this TCP connection between the source computing node and the destination computing node. Each handshake may include establishing a separate TCP sequence number for the communications. In such scenarios, the intermediary computing node may convert between these sequence numbers. That is, the intermediary computing node may keep track of the sequence numbering schemes used by the source computing node and the destination computing node, respectively. When the intermediary computing node receives a TCP packet from the source computing node that is directed to the instance, the intermediary computing node may convert a sequence number in that packet from a sequencing scheme used by the source computing node to a sequencing scheme used by the destination computing node before sending that converted packet to the destination computing node. Likewise, When the intermediary computing node receives a TCP packet from the destination computing node that is directed to the source computing node, the intermediary computing node may convert a sequence number in that packet from a sequencing scheme used by the destination computing node to a sequencing scheme used by the source computing node before sending the packet to the source computing node.

Figure 1:
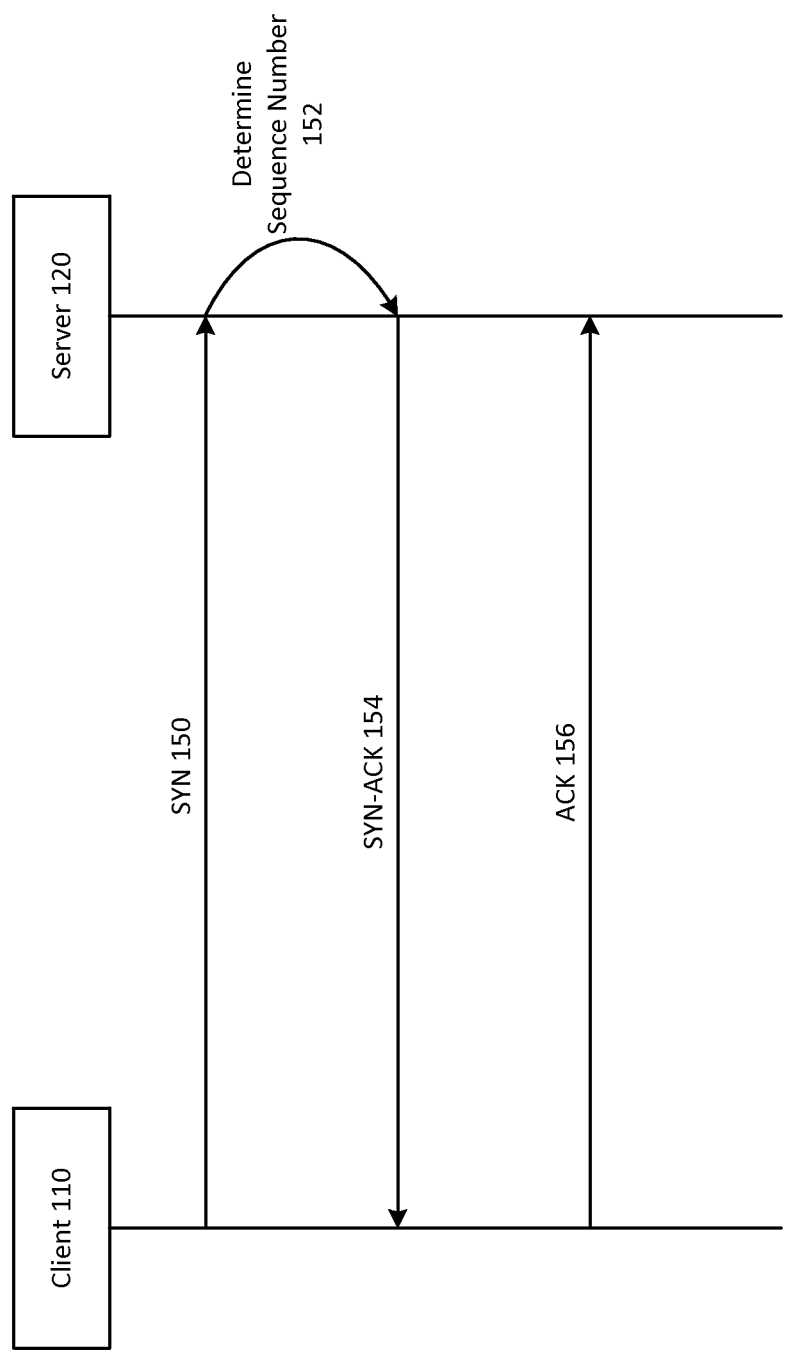
FIG. 1 depicts a communication flow for an example three-step TCP handshake.

By performing a TCP handshake between a source computing node and an destination computing node in this manner, the effects of a SYN flood attack may be mitigated. FIG. 1 depicts such a SYN flood attack in more detail, and the following figures depict ways in which a SYN flood attach may be mitigated according to the present embodiments.

FIG. 1 depicts a communication flow for an example three-step TCP handshake. This communication flow may be subject to a SYN flood attack. In contrast, the communication flows of FIGS. 4-5 protect against such a SYN flood attack. The communication flow of FIG. 1 (and FIGS. 4-5) may be viewed from the top down, where a communication that occurs closer to the top of the figure occurs earlier in time than a communication that occurs closer to the bottom of the figure. This three-step TCP handshake may occur, for example, between computer 202a of FIG. 2 (as client 110 here) and server 216a of FIG. 1 (as server 220 here). When a client 110 initiates a TCP connection with a server 120, the client 110 and server 120 may exchange a series of messages in accordance with the TCP protocol as follows:

(A) The client 110 requests a connection by sending a SYN (synchronize) message 150 to the server 120;

(B) The server 120 acknowledges the SYN message 150 by sending a SYN-ACK message 154 to the client 110;

(C) The client 110 responds by returning an ACK message 156 to server 120; and (D) Upon receipt of the ACK message 156 by the server 120, server 120 proceeds with establishing the connection.

In a SYN flood attack, an attacker sends a string of spurious SYN requests to a target system in an attempt to consume the target system's resources and render the target system unresponsive. Specifically, a SYN flood attack causes the target system to reserve resources for a large number of connections and wait for expected ACK messages that never arrive. For example, an attacker can send a string of SYN messages and (1) never send the expected ACK messages, or (2) spoof a source IP address in the spurious SYN messages with false source IP addresses. In the latter case, the target system sends SYN-ACK messages to the false IP addresses. Of course, since the false IP addresses did not actual send the initial SYN messages, no ACK messages are ever sent back to the target system.

In a normal TCP connection, when a client sends a SYN message to a server computer, the server computer typically binds a port in preparation for the connection. When the server computer generates a SYN-ACK message, the server computer also creates an entry in a SYN queue. A SYN queue is a queue for storing half-open connections awaiting SYN handshake completion. During a SYN attack, the SYN queue entries continue to queue up due to the growing number of half open connections as the attacker continues to generate more spurious SYN packets that in turn take up more entries in the queue. A server computer typically waits for an expected ACK message for a specified timeout period before cancelling the connection request and recovering the connection resources. During that time, the attacker can continue to flood the server computer with more connection requests. Eventually the server computer will run out of available ports and will not accept any new connection requests without dropping connections from the queue, resulting in a denial-of-service to legitimate connection requests.

One countermeasure for guarding against denial-of-service attacks is the use of SYN cookies. This technique protects against a SYN flood attack by not allocating resources on the target system when SYN messages are received. In the SYN cookie technique, a server computer that receives a SYN message sends back a SYN-ACK response to the client but does not reserve any resources (e.g., does not bind a port in preparation for the connection) and does not enter a SYN queue entry. However, the SYN-ACK message encodes information that can be used to recover the connection information if needed. If the server computer subsequently receives a legitimate ACK response from the client, the server computer reconstructs the connection information using the information encoded in the SYN-ACK response and establishes the connection.

More specifically, when establishing a normal TCP connection, the SYN-ACK response includes a sequence number that, per the TCP protocol, can be any value as determined by the server computer. The client, in response to receiving the SYN-ACK, will increment (i.e., add 1) to the received sequence number and include the incremented sequence number in the ACK message.

In the SYN cookie technique, the sequence number in the SYN-ACK response is specially constructed so that it can be used to reassemble the connection information if needed. For example, the sequence number may be a 32-bit number generated by concatenating a time stamp, a maximum segment size (MSS) value that the server computer would have stored as the SYN queue entry, and a unique identifier (e.g., a unique number that is only known to the gateway device and the server computers, or the output of a cryptographic function computed over the server IP address and port number), the client IP address and port number, and the time stamp.

When a client sends an ACK message to the server computer in response to the server computer's SYN-ACK message, the client adds the value 1 to the sequence number contained in the SYN-ACK message and includes the incremented sequence number in the ACK message. When the server computer receives the ACK message from the client, the server computer subtracts 1 from the incremented sequence number to recover the initial sequence number sent to the client. The server computer may then check the time stamp against the current time to determine if the connection is expired. The server computer may also check if the unique identifier returned in the ACK message matches the unique identifier sent in the SYN-ACK message. If a cryptographic function was used, then the server computer may recompute the output of the cryptographic function to determine whether the output received in the SYN-ACK message matches the recomputed output and is therefore valid. The server computer also decodes the MSS value from the received sequence number and uses it to reconstruct the SYN queue entry. The requested TCP connection can then be established per the normal process.

Figure 2:
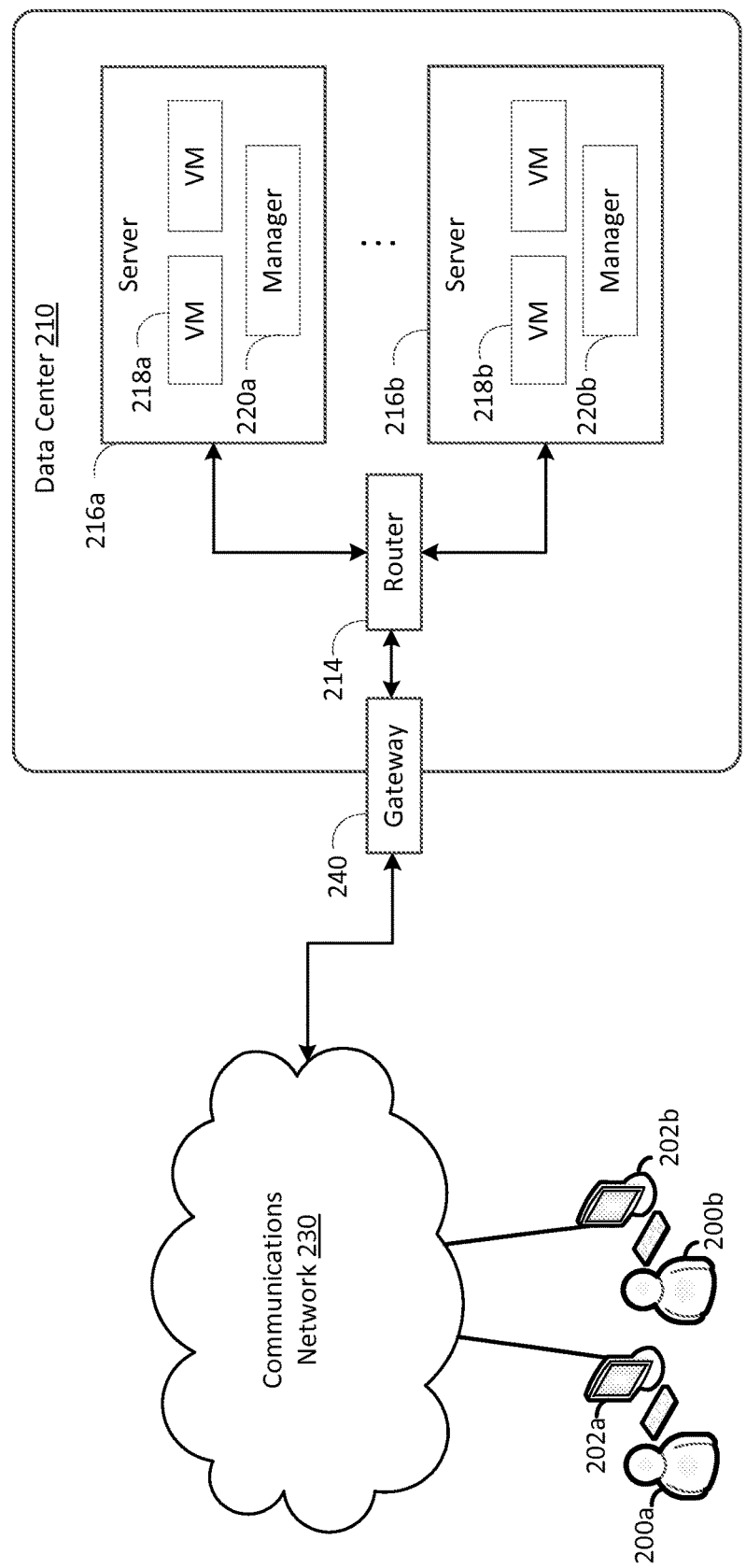
FIG. 2 depicts an example computing environment in which embodiments described herein may be implemented.

FIG. 2 illustrates an example computing environment in which the embodiments described herein may be implemented. For example, users 200a or 200b may establish a TCP connection between user computer 202a or 202b, respectively, and virtual machine instance 218a or 218b. Computer 202 may perform a three-step TCP handshake with gateway 240 or router 214. Then Gateway 240 or router 214 may send an ACK packet to server 216a. Manager 220a that executes on server 216a may receive this ACK packet, and in response, send a SYN packet to virtual machine instance 218a to initiate a three-step TCP handshake. Then, manager 220a may modify sequence numbers of TCP packets sent between computer 202a and virtual machine instance 218a. If a TCP packet is sent from computer 202a to virtual machine instance 218a, manager 220a may replace a sequence number used between computer 202a and gateway 240 (or router 214) with a sequence number used between manager 220a and virtual machine instance 218a. Similarly, if a TCP packet is sent from virtual machine instance to computer 202a, manager 220a may replace a sequence number used between manager 220a and virtual machine instance 218a with a sequence number used between computer 202a and gateway 240 (or router 214).

The computing environment depicted in FIG. 2 illustrates an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

Data center 210 may include servers 216a and 216b (which may be referred herein singularly as "a server 216" or in the plural as "the servers 216") that provide computing resources available as virtual machine instances 218a and 218b (which may be referred herein singularly as "a virtual machine instance 218" or in the plural as "the virtual machine instances 218"). The virtual machine instances 218 may be configured to execute applications, including Web servers, application servers, media servers, database servers and the like. Other resources that may be provided include data storage resources (not shown) and may include file storage devices, block storage devices and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. Computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

Computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216a and 216b shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances. The instance managers 220 may be a virtual machine monitor (VMM) or another type of program configured to enable the execution of virtual machine instances 218 on servers 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices in this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 3:
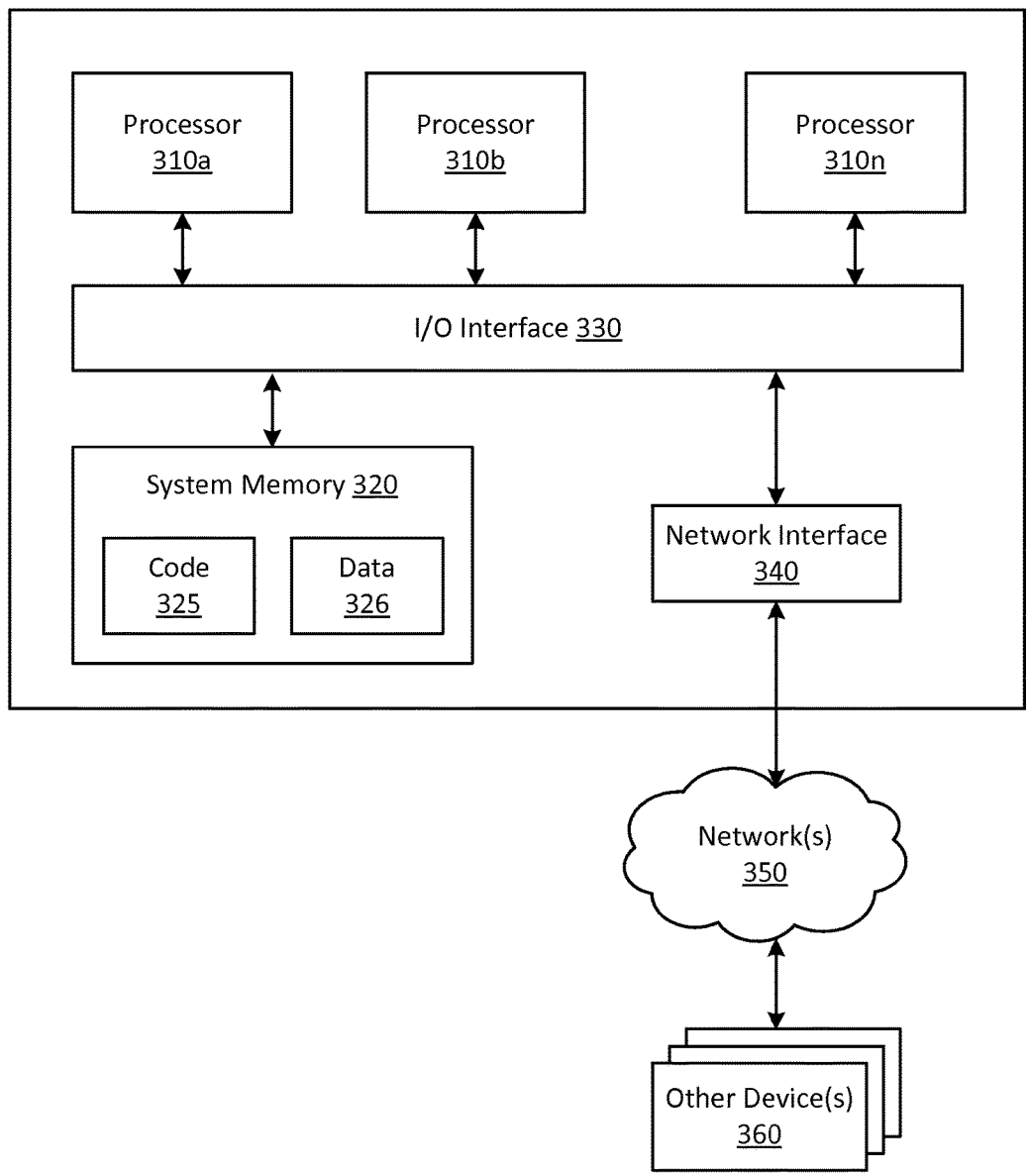
FIG. 3 depicts a general-purpose computer system in which embodiments described herein may be implemented.

Servers 116a and 216b of FIG. 2 may be implemented using computing device 200 of FIG. 2. FIG. 3 depicts a general-purpose computer system that includes or is configured to access one or more computer-accessible media. In the illustrated embodiment, computing device 300 includes one or more processors 310a, 310b and/or 310n (which may be referred herein singularly as "a processor 310" or in the plural as "the processors 310") coupled to a system memory 320 via an input/output (I/O) interface 330. Computing device 300 further includes a network interface 340 coupled to I/O interface 330.

In various embodiments, computing device 300 may be a uniprocessor system including one processor 310 or a multiprocessor system including several processors 310 (e.g., two, four, eight or another suitable number). Processors 310 may be any suitable processors capable of executing instructions. For example, in various embodiments, processors 310 may be general-purpose or embedded processors implementing any of a variety of instruction set architectures (ISAs), such as the x86, PowerPC, SPARC or MIPS ISAs or any other suitable ISA. In multiprocessor systems, each of processors 310 may commonly, but not necessarily, implement the same ISA.

System memory 320 may be configured to store instructions and data accessible by processor(s) 310. In various embodiments, system memory 320 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 320 as code 325 and data 326.

In one embodiment, I/O interface 330 may be configured to coordinate I/O traffic between processor 310, system memory 320 and any peripheral devices in the device, including network interface 340 or other peripheral interfaces. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computing device 300 and other device or devices 360 attached to a network or networks 350, such as other computer systems or devices, for example. In various embodiments, network interface 340 may support communication via any suitable wired or wireless general data networks, such as types of Ethernet networks, for example. Additionally, network interface 340 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 320 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 300 via I/O interface 330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 300 as system memory 320 or another type of memory. Further, a computer-accessible medium may include transmission media or signals such as electrical, electromagnetic or digital signals, conveyed via a communication medium such as a network and/or a wireless link, such as those that may be implemented via network interface 340. Portions or all of multiple computing devices such as those illustrated in FIG. 3 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A network set up by an entity such as a company or a public sector organization to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

FIG. 4 depicts a communication flow for an example TCP handshake according to embodiments. The communication flow of FIG. 4 may be contrasted with the communication flow of FIG. 1, inasmuch as the communication flow of FIG. 4 may mitigate problems raised by a SYN flood attack. As depicted, there are four entities in the communication flow of FIG. 4—client 410, edge device 420 (which may be, for instance, a router, a gateway, a network appliance, or a network address translation (NAT) device), physical host 430, and instance 440. In embodiments, client 410 may be computer 202a or 202b of FIG. 2; edge device 420 may be gateway 240 or router 214 of FIG. 2; physical host 430 may be server 216a or 216b of FIG. 2; and instance 440 may be instance 218a or 218b of FIG. 2 (depending on whether physical host 430 is server 216a, or 216b, respectively). It may be appreciated that there are embodiments that are implemented on different entities. For example, there may be embodiments where the function of physical host 430 is performed by a computing node that does not host instance 440, and there may be embodiments where instance 440 is not a hosted instance, but is a separate physical computing node. There may also be embodiments where the function of physical host 430 is performed by edge device 420 (and in such embodiments, an ACK packet may not be sent between the two entities, as the one entity that performs both roles will have received the ACK packet from the client). The illustrative embodiments described herein generally involve a physical host that hosts an instance, but it may be appreciated that these techniques may be applied to these other embodiments as well. As used herein, a computing node may be a physical computing device, a virtual machine instance that executes on a physical computing device, or a hardware resource, such as a network router or network switch.

Client 410 intends to establish a TCP handshake with instance 440. However, in FIG. 4, client 410 establishes a TCP handshake with edge device 420. Then edge device 420 communicates with physical host 430 so that physical host 430 establishes a separate TCP handshake with instance 440. In this separate TCP handshake, instance 440 intends that it is establishing a TCP handshake with client 410. Then, as described in more detail in FIG. 5, communications between client 410 and instance 440 involve client 410 and instance 440 using different sequences for sequence numbers, with physical host 430 translating between the two sequences as physical host 430 receives incoming and outgoing TCP communications.

The communication flow of FIG. 4 begins with client 410 sending SYN packet 450 to edge device 420. In response to receiving SYN packet 450, edge device 420 may determine a sequence number 452 for the TCP communication stream. After determining a sequence number 452 for the TCP communication stream, edge device 420 may send SYN-ACK packet 454 to client 410. In response to receiving SYN-ACK packet 454, client may send ACK packet 456 to edge device 420. At this point, the TCP handshake has been established from the point of view of client 410.

Once the TCP handshake has been established from the point of view of client 410, edge device 420 (along with physical host 430) works to establish a TCP handshake from the point of view of instance 440. Edge device 420 forwards ACK packet 456 received from client 410 in the form of ACK packet 458, which is forwarded to physical host 430. While the two ACK packets are depicted here with different reference numerals, this is for clarity, and there are embodiments where ACK packet 456 and ACK packet 458 are identical. In embodiments, it is not an ACK packet that is sent from edge device 420 to physical host 430, but some other indication that the router has established a TCP handshake with the client that prompts the physical host to establish another TCP handshake with the instance.

When physical host 430 receives ACK packet 458, physical host 430 generates a SYN packet from ACK packet 458, and sends SYN packet 460 to instance 440. To instance 440, SYN packet 460 appears to have been originated from client 410. Upon receiving SYN packet 460, instance 440 determines a sequence number 462 for the TCP communication stream. Instance 440 then sends a SYN-ACK packet 464 to physical host 430. Physical host 430 responds by sending an ACK packet 466 to instance 440, which, from the point of view of instance 440, appears to have been originated from client 410.

Thus, both client 410 and instance 440 are under the impression that they have established a TCP handshake with the other entity. Client 410 and instance 440 may then communicate via a TCP connection, with physical host 430 modifying sequence numbers in the TCP packets to fit in the respective expected sequence schemes of client 410 and instance 440. This is described in more detail with respect to FIG. 5.

Figure 5:
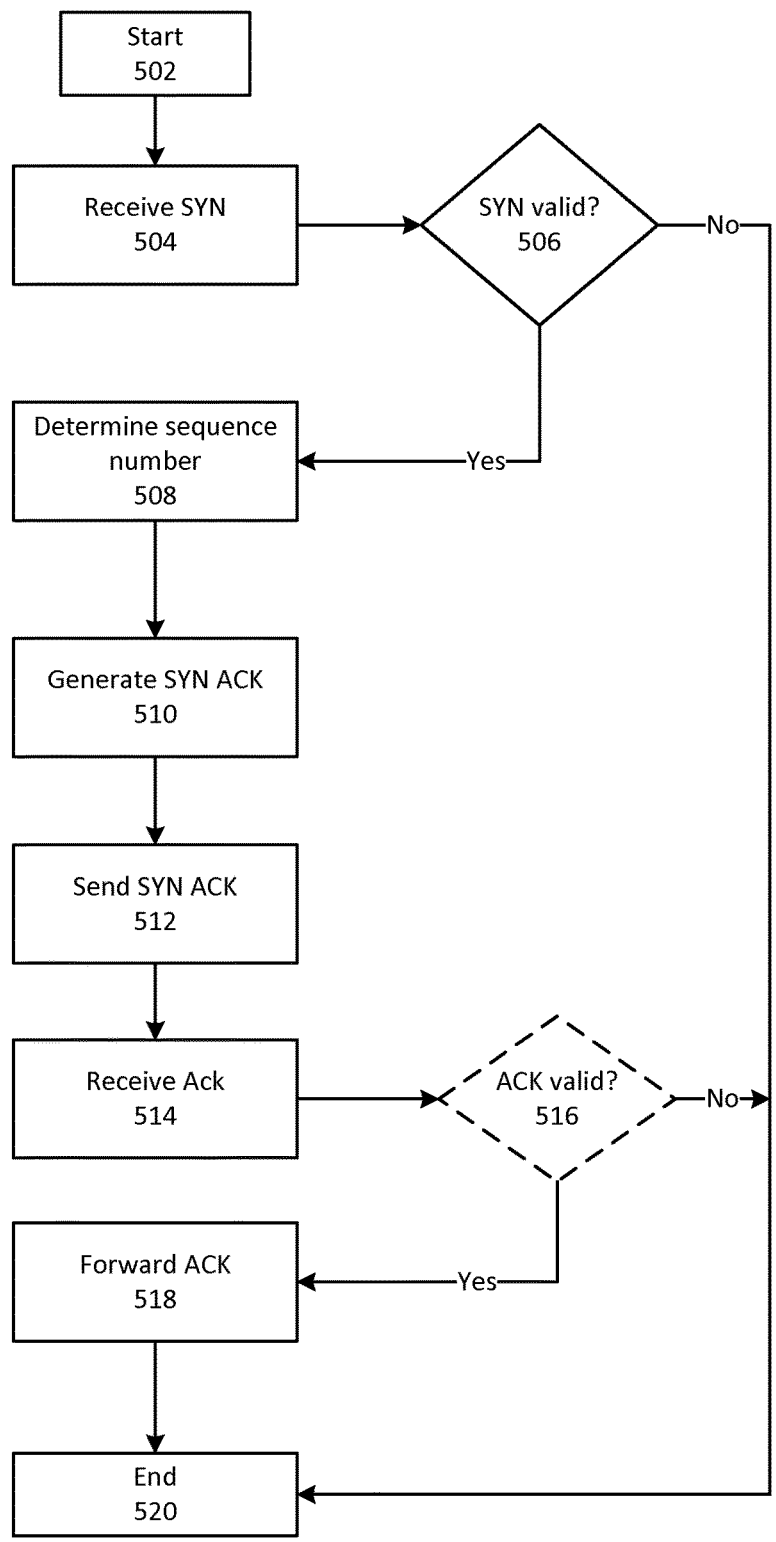
FIG. 5 depicts example operating procedures for a router performing a TCP handshake with a client according to embodiments.

FIG. 5 depicts example operating procedures for a router performing a TCP handshake with a client according to embodiments. For example, the operating procedures of FIG. 5 may be implemented by edge device 420 of FIG. 4 as edge device 420 communicates with client 410 and physical host 430 of FIG. 4. The operating procedures of FIG. 5 begin with operation 502, and then proceed to operation 504.

Operation 504 depicts receiving a SYN packet. This may be SYN packet 450 of FIG. 4. After operation 504, the operating procedures of FIG. 5 move to operation 506.

Operation 506 depicts determining whether the SYN packet is valid. In embodiments, determining whether the SYN packet is valid may comprise using checksum 1018 of FIG. 10 to determine that no data in the header of packet 1000 has been corrupted (where checksum 1018 is a checksum for the header of packet 1000). If the SYN packet is valid, the operating procedures of FIG. 5 move to operation 508. If the SYN packet is not valid, the operating procedures of FIG. 5 move to operation 520, where the operating procedures of FIG. 5 end (after possibly issuing an error message that indicates that the SYN packet is not valid).

Operation 508 depicts determining a sequence number. This initial sequence number may be generated to be effectively random so that it may not be guessed by a third party that desires to spoof TCP packets sent between the client and the instance. Then, future packets in the TCP communication between the client and the instance may increment the sequence number by one, so that an order of the packets may be ascertained from the sequence numbers. After operation 508, the operating procedures of FIG. 5 move to operation 510.

Operation 510 depicts generating a SYN-ACK packet. This may be a TCP packet that has both the SYN and ACK bits set to On or True. Additionally, this SYN-ACK packet may switch the values stored in the source port and destination port fields (e.g., source port 1002 and destination port 1004 of FIG. 10) from the SYN packet received in operation 504, since the SYN-ACK packet is being sent back to the client that originated the SYN packet. After operation 510, the operating procedures of FIG. 5 move to operation 512.

Operation 512 depicts sending the SYN-ACK packet to the client computing node. This may be SYN-ACK packet 454 of FIG. 4. After operation 512, the operating procedures of FIG. 5 move to operation 514.

Operation 514 depicts receiving an ACK packet. This may be ACK packet 456 of FIG. 4. After operation 516, the operating procedures of FIG. 5 move to operation 516.

Operation 516 depicts determining whether the ACK packet is valid. While there are embodiments that make some or all of these operations optional, operation 516 is depicted with a dashed line to illustrate here that it is an optional operation. Where operation 516 is not implemented, the operating procedures of FIG. 5 may flow from operation 514 to operation 518.

Where operation 516 is implemented, in embodiments, this operation may be performed in a similar manner as operation 506. If the ACK packet is valid, the operating procedures of FIG. 5 move to operation 518. If the ACK packet is not valid, the operating procedures of FIG. 5 move to operation 520, where the operating procedures of FIG. 5 end (after possibly issuing an error message that indicates that the ACK packet is not valid).

Operation 518 depicts forwarding the ACK packet to a physical host for the instance. In embodiments, the ACK packet received in operation 516 is forwarded to the physical host without alteration. In other embodiments, the packet is encapsulated or otherwise altered before the encapsulated ACK packet is sent to the physical host. For example, the packet may be encapsulated, given a custom IP header, or, in the case of packet in an IPv6 format (for example), an address field of the packet may be modified. These techniques may be used to include metadata with the packet. This metadata may indicate a sequence number, sequencing scheme, or secret used to generate a sequencing scheme used by the router (the secret may be a piece of data, such as one used to generate cryptographically secure numbers for the sequencing scheme), so that the instance may use the same sequencing scheme. This metadata may also indicate various TCP options that were identified by the client when sending the SYN packet received in operation 504. These TCP options may indicate, for example, a maximum segment size, whether SACK is permitted, whether a trailer checksum may be used, whether TCP compression filter may be used, or whether quick-start response may be used. After operation 518, the operating procedures move to operation 520, where the operating procedures of FIG. 5 end.

Figure 6:
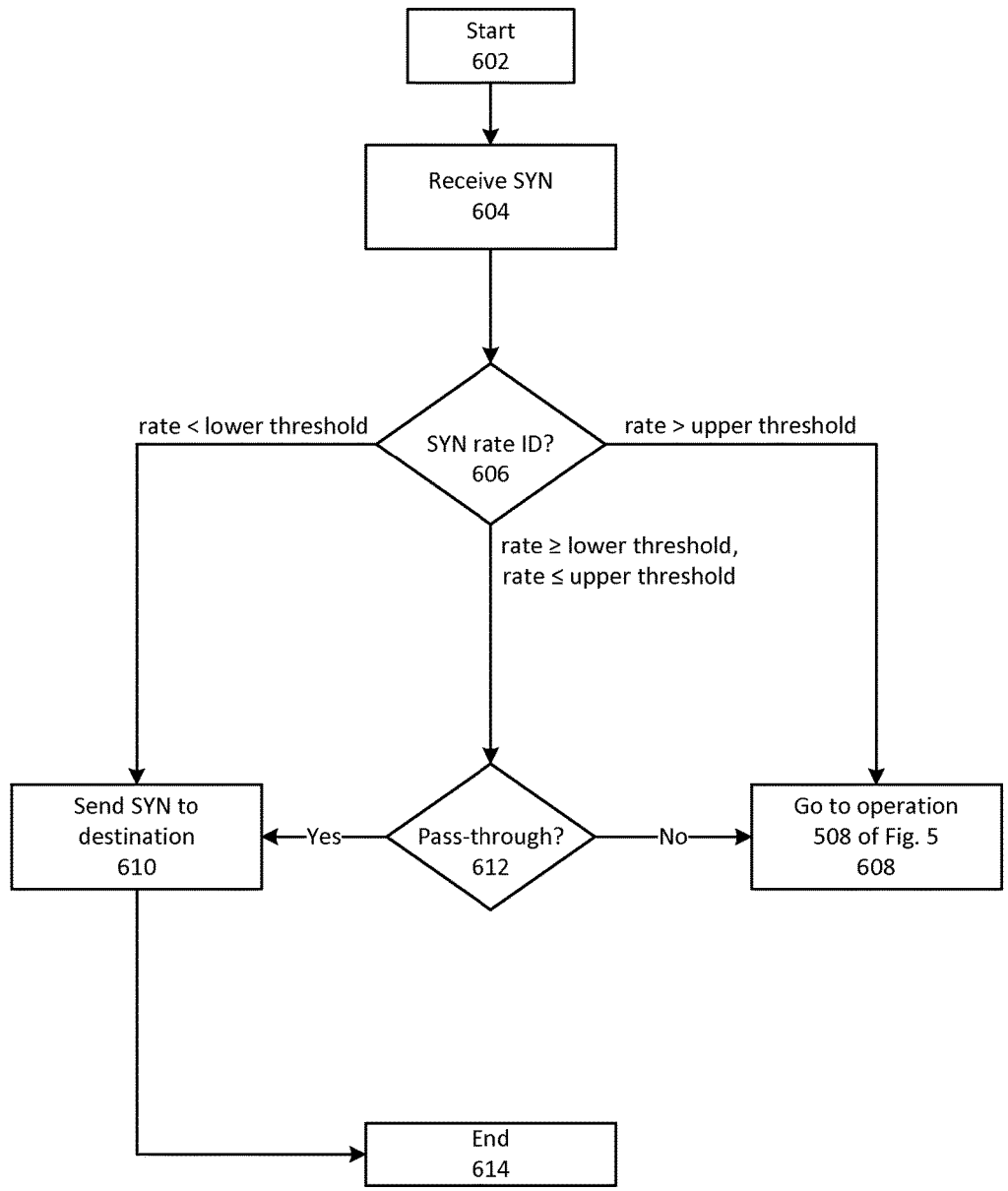
FIG. 6 depicts example operating procedures for a router performing a TCP handshake with a client, where the router may selectively pass-through SYN packets to the destination, according to embodiments.

The operating procedures of FIG. 5 depict embodiments where a TCP connection handshake is performed by a router. There may also be embodiments where the router performs some TCP connection handshaking, and passes through other SYN packets to the client for the client to perform the TCP connection handshake. FIG. 6 depicts such embodiments. FIG. 6 depicts example operating procedures for a router performing a TCP handshake with a client, where the router may selectively pass-through SYN packets to the destination, according to embodiments. As with FIG. 5, the operating procedures of FIG. 6 may be implemented by edge device 420 of FIG. 4 as edge device 420 communicates with client 410 and physical host 430 of FIG. 4. The operating procedures of FIG. 6 begin with operation 602, and then move to operation 604.

Operation 604 depicts receiving a SYN packet. This operation may be performed in a similar manner as operation 504 of FIG. 5. After operation 604, the operating procedures of FIG. 6 move to operation 606.

Operation 606 depicts determining a rate of SYN packets that are being received that are destined for the instance. This may be measured in a number of packets received by the router that are destined for the instance in a given time period. This rate may change over time as more or fewer packets are received that are destined for the instance within the given time period. Where this rate changes over time, the operating procedures of FIG. 6 may be repeated, and whether selective pass-through is implemented may be changed based on this new rate. The rate at which these packets are received may be compared to two thresholds— (1) a lower threshold, below which all packets are passed through to the instance; and (2) an upper threshold above which all packets are processed by the router (via sending a SYN-ACK to the originator of the packets rather than passing the SYN packet to the instance). Where the rate is between these two thresholds, the router may process some of the packets, and pass some of the packets through to the instance.

Where the rate of SYN packets being received is below a lower threshold, the operating procedures of FIG. 6 move to operation 610. Where the rate of SYN packets being received is above an upper threshold, the operating procedures of FIG. 6 move to operation 508 of FIG. 5. That is, the router completes the TCP handshake with the client and then sends an ACK to the physical host, which then completes its own handshake with the instance to establish a TCP handshake from the client to the host.

Where the rate of SYN packets being received is above the lower threshold and below the upper threshold, the operating procedures of FIG. 6 move to operation 612. Operation 612 depicts determining whether to pass the SYN packet through to the instance. Operation 612 may flow from operation 606 where it is determined that some packets should be passed through to the instance and some should be processed by the router, because the rate of packets being received is at this middle level, where it is above the lower threshold but below the upper threshold. In this case, a rate of packets to pass through to the instance may be determined. For instance, this rate of packets to pass through may be inversely proportional to the rate of packets being received. Let the difference in packets being received between the lower threshold and the upper threshold be 100 packets per second. Then, where the rate of packets being received is 30 packets per second above the lower threshold, 70% of the packets may be passed through to the instance. Or, where the rate of packets being received is 60 packets per second above the lower threshold, 40% of the packets may be passed through to the instance.

Whether a particular packet should be passed through or not may be determined, for example, using a random number generator. Continuing with the example above where 40% of the packets are passed through to the instance, a random number may be generated that varies over integers from 1-100. Where that random number is between 1 and 40, the packet may be passed through to the instance, and otherwise the packet may be processed by the router. Where it is determined not to pass the SYN packet through to the instance, the operating procedures of FIG. 6 move to operation 508 of FIG. 5, as described above. Where it is determined to pass the SYN packet through to the instance, the operating procedures of FIG. 6 move to operation 610.

Operation 610 depicts sending the SYN packet to the instance. This may comprise sending the SYN packet to the physical host, which will forward the packet to the instance. In embodiments, metadata may be added to the SYN packet before sending it to the instance, similar to that described for operation 518 of FIG. 5. For example, the router may add metadata to the packet that indicates a rate at which SYN packets destined for the instance are being received. After operation 610, the operating procedures of FIG. 6 move to operation 614, where the operating procedures of FIG. 6 end.

Figure 7:
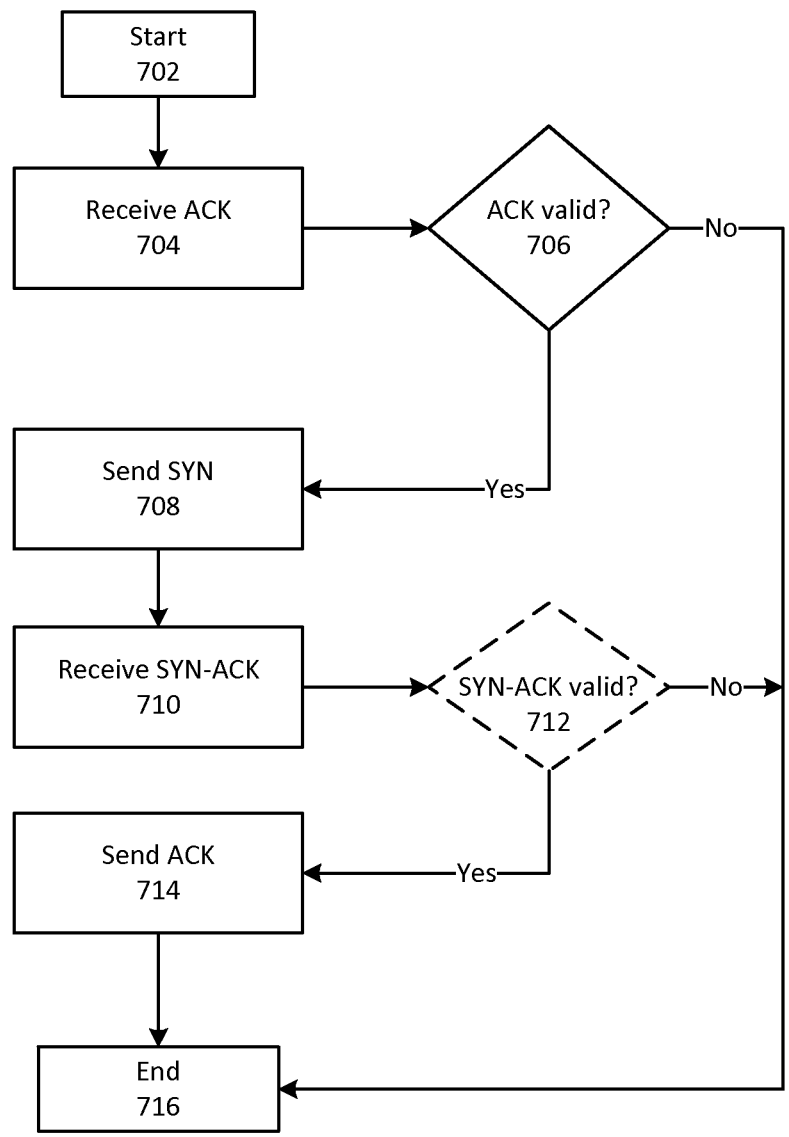
FIG. 7 depicts example operating procedures for a physical host performing a TCP handshake with an instance in response to receiving an ACK packet from a router, according to embodiments.

FIG. 7 depicts example operating procedures for a physical host performing a TCP handshake with an instance in response to receiving an ACK packet from a router, according to embodiments. The physical host may receive an ACK packet from the router as a result of the operating procedures of FIG. 5, where the router performs a handshake with a client, and then forwards the ACK to the physical host. The physical host may also receive an ACK packet from the router as a result of the operating procedures of FIG. 6, where the router selectively performs a handshake with a client and then forwards the ACK to the physical host, based on a rate at which packets destined for the instance are being received by the router. The operating procedures of FIG. 7 begin with operation 702, and then move to operation 704.

Operation 704 depicts receiving an ACK packet from a router. This ACK packet may be ACK packet 458 of FIG. 4. After operation 704, the operating procedures of FIG. 7 move to operation 706.

Operation 706 depicts determining whether the ACK packet is valid. This operation may be implemented in a similar manner as operation 506 of FIG. 5. Where the ACK packet is valid, the operating procedures of FIG. 7 move to operation 708. Where the ACK packet is invalid, the operating procedures of FIG. 7 move to operation 716, where the operating procedures of FIG. 7 end.

Operation 708 depicts sending a SYN packet to the instance. This SYN packet may be SYN packet 460 of FIG. 4. After operation 708, the operating procedures of FIG. 7 move to operation 710.

Operation 710 depicts receiving a SYN-ACK packet from the instance. This SYN-ACK packet may be SYN-ACK packet 464 of FIG. 4. After operation 710, the operating procedures of FIG. 7 more to operation 712.

Operation 712 depicts determining whether the SYN-ACK packet is valid. This operation may be implemented in a similar manner as operation 506 of FIG. 5. Similar to as described with respect to operation 516 of FIG. 5, operation 712 may be optional. Where operation 712 is not implemented, the process flow of FIG. 7 may move from operation 710 to operation 714. Where in operation 712 it is determined that the SYN-ACK packet is valid, the operating procedures of FIG. 7 move to operation 714. Where the SYN-ACK packet is invalid, the operating procedures of FIG. 7 move to operation 716, where the operating procedures of FIG. 7 end.

Operation 714 depicts sending an ACK packet to the instance. This ACK packet may be ACK packet 464 of FIG. 4. After operation 714, the operating procedures of FIG. 7 move to operation 716, where the operating procedures of FIG. 7 end.

Figure 8:
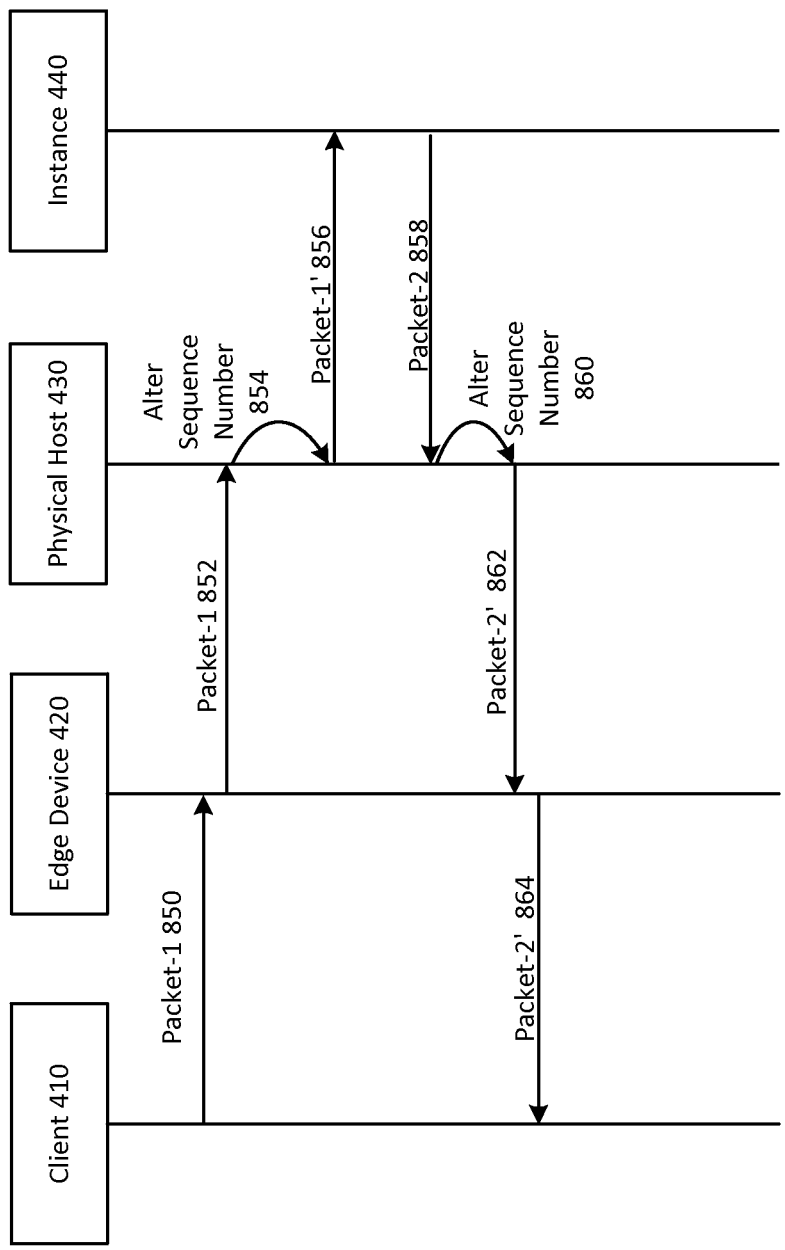
FIG. 8 depicts an example communication flow of TCP packets after a TCP handshake has been established, such as by the communication flow of FIG. 4.

FIG. 8 depicts an example communication flow of TCP packets after a TCP handshake has been established, such as by the communication flow of FIG. 4. The communication flow of FIG. 4 depicts establishing a TCP connection. Once this TCP connection has been established, a communication flow such as in FIG. 8 may take place, where client 410 and instance 440 send TCP packets to each other, and physical host 430 translates between their respective sequence numbers that are identified in the packet.

The communication flow of FIG. 8 begins with client 410 sending packet-1 850 to edge device 420. Packet-1 850 is destined for instance 440. Edge device 420 receives packet-1 850 and forwards it to physical host 430, depicted here as sending packet-1 852 to physical host 430. This is labeled as packet-1 852 as opposed to packet-1 850 for ease of identification, and because edge device 420 may have altered the packet before sending it to physical host 430.

When physical host 430 receives packet-1 852, physical host 430 determines how to alter the sequence number of the packet. For example, a sequence that client 410 uses to identify packets that it sends to instance 440 and a sequence that instance 440 uses to identify packets that it sends to client 410 may differ, even though they are part of the same TCP communication between client 410 and instance 440. In these embodiments, client 410 may identify packets with a sequence number using a first offset, and instance 440 may identify packets with a sequence number using a second offset. The difference between the first offset and the second offset may be a delta, and physical host 430 may add this delta to a sequence number in packets received from client 410 before sending those packets to instance 440, and subtract this delta from a sequence number in packets received from instance 440 before sending those packets to client 410 (or vice versa, where the offset used by instance 440 is smaller than the offset used by client 410). Physical host 430 then alters the sequence number 854 of packet-1 852, and sends this altered packet to instance 440, depicted here as packet-1' 856. In embodiments, altering the sequence number may comprise converting a sequence number in the packet from a numbering scheme used by the client to a numbering scheme used by the instance. These numbering schemes may be determined by the host based on packets the host has received. For instance, the numbering scheme used by the client may be determined based at least in part on a sequence number identified in the ACK packet sent from the router to the host, and a numbering scheme used by the instance may be determined based at least in part on a sequence number identified in the SYN-ACK packet sent from the instance to the host.

Before edge device 420 sends packet-1 582 to physical host 430, edge device 420 may add metadata to the packet. For instance, edge device 420 may encapsulate the packet, add an IP header to the packet, modify an address in the packet where the packet is in an IPv6 (Internet Protocol version 6) format, or otherwise add metadata to the packet. This metadata may comprise a TCP option indicated in the SYN packet received from the client. Where this metadata is such a TCP option, the router may buffer the SYN packet while establishing the TCP handshake with the client, then add this metadata about the TCP option to an ACK packet that the router generates and stop buffering this SYN packet.

This metadata may also comprise metadata that indicates things that the router has determined. For example, this metadata may comprise an indication that the ACK packet has been validated by the router, a rate of SYN packets being received by the router that are destined for the instance, an indication of an amount of trust associated with the client that the router possesses, or an indication of the sequence numbering scheme used by the client and the router and determined during the TCP handshake between the client and the router.

A similar communication flow occurs when instance 440 sends a responsive packet to client 410 (or instance 440 sends a packet to client 410 that is not in response to a packet received from client 410). Instance 440 sends packet-2 858 to physical host 430. This packet is destined for client 410. Physical host 430 receives packet-2 858 and, in response, determines how to alter the sequence number of this packet. This may be done in a similar manner as determining how to alter the sequence number of packet-1 852, as described above. Physical host 430 then alters the sequence number 858 of packet-2 858, and sends the resulting altered packet, packet-2' 862 to edge device 420. Edge device 420 receives packet-2', and in response, sends packet-2' 864 to client 410.

Figure 9:
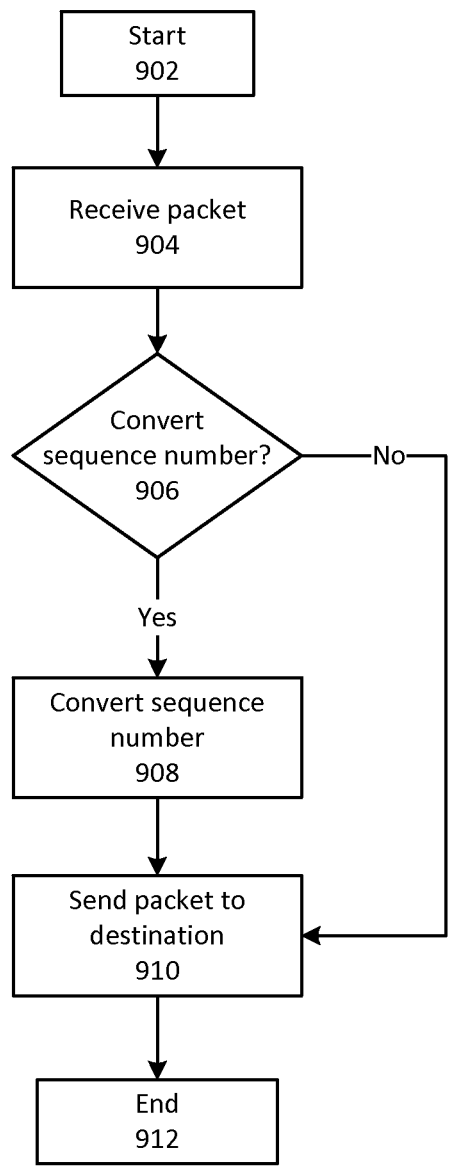
FIG. 9 depicts example operating procedures for a physical host transmitting packets sent between a client computing node and an instance after a TCP connection has been established, according to embodiments.

FIG. 9 depicts example operating procedures for a physical host transmitting packets sent between a client computing node and an instance after a TCP connection has been established, according to embodiments. These operating procedures of FIG. 9 may be implemented by physical host 430 of FIG. 8 as physical host 430 performs its role in the communication flow depicted in FIG. 8. The operating procedures of FIG. 9 may be applied to both packets that are originated by the client and destined for the instance, and packets that are originated by the instance and are destined for the client. The operating procedures of FIG. 9 begin with operation 902, and then move to operation 904.

Operation 904 depicts receiving a packet. In embodiments, this may be packet-1 852 (where the packet is originated by the client and destined for the instance), or packet-2 858 (where the packet is originated by the instance and destined for the client) of FIG. 8. After operation 904, the operating procedures of FIG. 9 move to operation 906.

Operation 906 depicts determining whether to alter a sequence number of the packet. It may be that the original TCP handshake with the client is performed by the router, and that the client and the instance are using different sequences to number the packets that they originate. This may be implemented by determining whether the original TCP handshake was performed by the router (in which case the sequence number of the packet may be altered), or whether the router passed through the original SYN packet from the client to the instance, so that the instance might perform the handshake (in which case the sequence of the packet may not be altered, since the client and the instance are using the same sequence numbering as determined by their TCP handshake). Where it is determined to alter the sequence number of the packet, the operating procedures of FIG. 9 move to operation 908. Where it is determined not to alter the sequence number of the packet, the operating procedures of FIG. 9 move to operation 910.

Operation 908 depicts altering the sequence number of the packet. The physical host may maintain a mapping between the sequence used by the client and the sequence used by the instance (such as a number that is added to a sequence number in a packet originated by the client, and that is subtracted from a sequence number in a packet that is originated by the instance). The physical host may then use this mapping to alter the sequence number, such as is described with respect to alter sequence number 854 (for a packet originated by the client), and alter sequence number 860 (for a packet originated by the instance) in FIG. 8. After operation 908, the operating procedures of FIG. 9 move to operation 910.

Operation 910 depicts sending the packet to the destination. Where the packet that was received in operation 904 was packet-1 852, this may comprise sending packet-1' 856 to the instance (provided that it was determined to alter the sequence number in operation 906; otherwise this sent packet may be one where the sequence number is not altered). Where the packet that was received in operation 904 was packet-2 858, this may comprise sending packet-2' 862 to the client, via the router (provided that it was determined to alter the sequence number in operation 906; otherwise this sent packet may be one where the sequence number is not altered). After operation 910, the operating procedures of FIG. 9 move to operation 912, where the operating procedures of FIG. 9 end.

Figure 10:
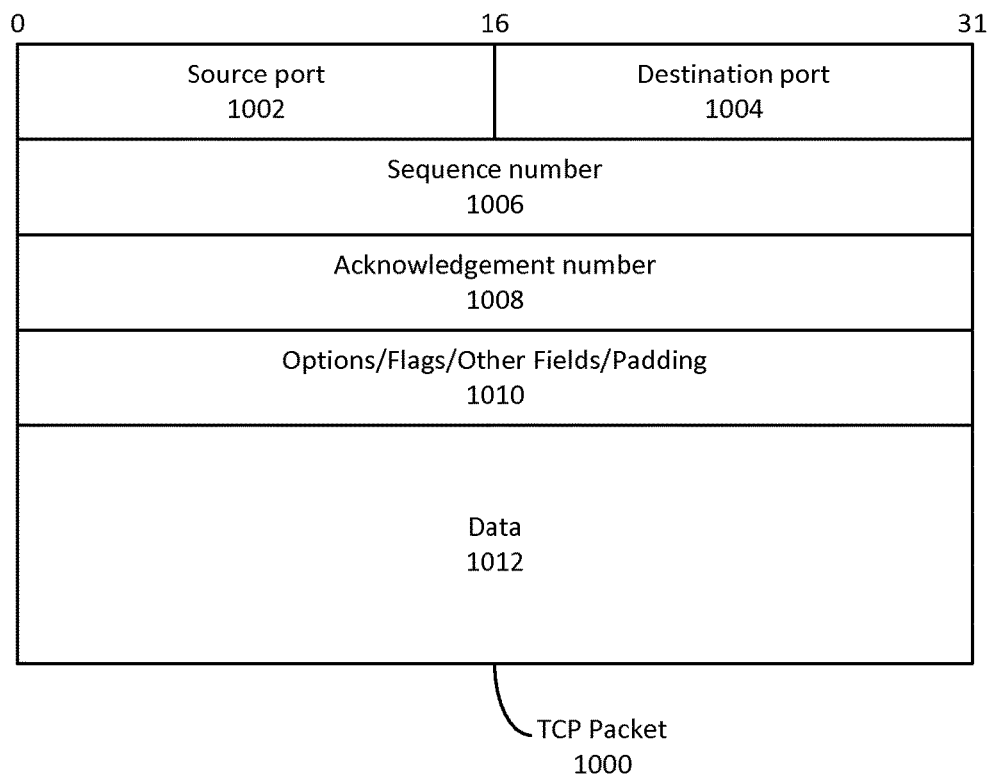
FIG. 10 depicts an example TCP packet in which embodiments may be implemented.

FIG. 10 depicts an example TCP packet in which embodiments may be implemented. Particularly, TCP packet 1000 contains sequence number 1006, which may be modified by a computing node, such as physical host 430 of FIG. 8 to alter a TCP packet's sequence number between a sequence number used by client 410 and a sequence number used by instance 440. The other portions of TCP packet 1000 are described as follows.

The top of TCP packet 1000 is marked with "0," "16," and "31" to indicate a number of bits in TCP packet 1000. For example, these numbers indicate that source port 1002 and destination port 1004 each have a size of 16 bytes. It may be appreciated that this is a logical depiction of TCP packet 1000, and that TCP packet 1000 may be implemented as a contiguous sequence of bits that is not divided up into 32-bit chunks. TCP packet 1000 begins with source port 1002 and destination port 1004. Source port 1002 and destination port 1004 identify sockets at which higher layer (in the OSI—Open Systems Interconnect—model) may receive TCP services. Acknowledgement number 1008 indicates a sequence number assigned to the next byte of data that the sender of the packet expects to receive.

Options/flags/other fields/padding 1010 may contain a variety of information. For example, it may contain a data offset that indicates the number of 32-bit words in the TCP header. It may contain flags that indicate a variety of control information. It may indicate a size of the sender's receive window—the sender's buffer space available for incoming data. It may contain checksum information used to determine whether the TCP packet was damaged in transmission across a communications network. It may include a pointer to a first urgent data byte in TCP packet 1000. It may specify various TCP options, and may also include padding to increase its length to 32 bytes (or, e.g., some multiple of 32 bytes). As depicted, options/flags/other fields/padding 1010 is shown as having a length of 32 bytes. This is illustrative, and there may be embodiments where it has a longer or shorter length. Data 1024 is the data payload of TCP packet 1000 and may have a variable length.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. Such systems may comprise at least one memory that bears instructions that, upon execution by at least one processor, cause the system to effectuate certain results as described herein.

Most embodiments utilize at least one network that would be familiar to those skilled in the art for supporting communications using any of a variety of commercially-available protocols, such as TCP/IP (transmission control protocol/internet protocol), OSI (open systems interconnection), FTP (file transfer protocol), UPnP (universal plug and play), NFS (network file system), CIFS (common internet file system) and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java® servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially-available from Oracle®, Microsoft®, Sybase® and IBM®.

The environment can include a variety of data stores and other memory and storage media as discussed above. These can reside in a variety of locations, such as on a non-transitory computer-readable medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards etc.

Such devices also can include a computer-readable storage media reader, a communications device (e.g., a modem, a network card (wireless or wired), an infrared communication device etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It may be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to non-transitory, volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It may be understood, however, that there is no intention to limit the embodiments to the specific form or forms disclosed, but on the contrary, the intention is to cover all modifications, alternative constructions and equivalents falling within the spirit and scope of the embodiments, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the embodiments unless otherwise claimed. No language in the specification should be construed as indicating any non-claimed element as essential to the practice of the embodiments.

Preferred embodiments of this disclosure are described herein, including the best mode known to the inventors for carrying out the embodiments. Variations of those preferred embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this embodiment includes all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

All references, including publications, patent applications and patents cited herein are hereby incorporated by reference to the same extent as if each reference were individually and specifically indicated to be incorporated by reference and were set forth in its entirety herein.

What is claimed is:

1. A Transmission Control Protocol (TCP) connection system comprising:
   a first intermediary computing node bearing in a non-transitory medium instructions that, upon execution on a processor, cause the first intermediary node to at least:
      receive a first TCP SYN packet from a source computing node directed to a destination computing node;
      send a first TCP SYN-ACK packet, generated by the first intermediary computing node, to the source computing node in response to receiving the first TCP SYN packet; and
      send, in response to receiving a first TCP ACK packet from the source computing node, an indication to a second intermediary computing node; and
   the second intermediary computing node, the second intermediary computing node bearing instructions that, upon execution, cause the second intermediary computing node to:
      send a second TCP SYN packet, generated by the second intermediary computing node and containing a source address corresponding to the source computing node, to the destination computing node, in response to receiving the indication from the first intermediary computing node;
      receive a second TCP SYN-ACK packet from the destination computing node;
      send a second TCP ACK packet to the destination computing node in response to receiving the second TCP SYN-ACK packet;
      determine a first sequence number from the indication of the first TCP ACK packet, the first sequence number indicating a TCP sequence numbering scheme used by the source computing node;

determine a second sequence number from the second TCP SYN-ACK packet, the second sequence number indicating a TCP sequence numbering scheme used by the destination computing node;

receive a packet originated from the source computing node and destined for the destination computing node;

convert a TCP sequence number in a packet originated from the source computing node to the TCP sequence numbering scheme used by the destination computing node based at least in part on the first sequence number and the second sequence number; and send the converted packet to the destination computing node.

2. The system of claim 1, wherein the second intermediary computing node further bears instructions that, upon execution, cause the second intermediary computing node to at least to: determine the first sequence number from the TCP ACK packet;

determine the second sequence number from the second TCP SYN packet;

receive, from the first intermediary computing node, the packet originated from the destination computing node and destined for the source computing node;

convert the packet to the TCP sequence numbering scheme used by the source computing node based at least in part on the first sequence number and the second sequence number; and send the converted packet to the source computing node.

3. The system of claim 1, wherein the first intermediary computing node comprises an edge device, wherein the second intermediary computing node comprises a host computing device, and wherein the destination computing node comprises a virtual machine instantiated on the host computing device.

4. A computer-implemented method, comprising:

receiving, by a first intermediary computing node, an ACK packet as part of a Transmission Control Protocol (TCP) handshake with a computing node;

sending, by the first intermediary computing node, in response to receiving the ACK packet, an indication to a second intermediary computing node;

sending, by the second intermediary computing node, a SYN packet to a second computing node in response to receiving the indication, a source address of the SYN packet being based at least in part on a source address of at least one packet received as part of the TCP handshake;

receiving, by the second intermediary computing node, a SYN-ACK packet from the second computing node after sending the SYN packet to the second computing node;

sending, by the second intermediary computing node, a second ACK packet to the second computing node in response to receiving the SYN-ACK packet;

receiving, by the second intermediary computing node, a packet originated from the computing node and destined for the second computing node;

converting, by the second intermediary computing node, a sequence number in the packet from a numbering scheme used by the computing node to a numbering scheme used by the second computing node; and sending the converted packet to the second computing node.

5. The method of claim 4, further comprising:

determining the numbering scheme used by the computing node based at least in part on the ACK packet; and determining the numbering scheme used by the second computing node based at least in part on the SYN-ACK packet.

6. The method of claim 4, further comprising:

receiving a packet originated from the second computing node and destined for the computing node;

converting a sequence number in the packet from a numbering scheme used by the second computing node to a numbering scheme used by the computing node; and sending the converted packet to the computing node.

7. The method of claim 4, wherein sending the second ACK packet to the second computing node comprises:

receiving, by the first intermediary computing node, a second SYN packet, the second SYN packet indicating a TCP option;

encapsulating the second ACK packet with an indication of the TCP option; and sending the encapsulated second ACK packet to the second computing node.

8. The method of claim 4, wherein sending the second ACK packet to the second computing node comprises:

receiving, by the first intermediary computing node, a second SYN packet, the second SYN packet indicating a TCP option; and adding an IP header to the second ACK packet before sending the second ACK packet to the second computing node, the IP header comprising an indication of the TCP option.

9. The method of claim 4, wherein sending the second ACK packet to the second computing node comprises:

receiving, by the first intermediary computing node, a second SYN packet, the second SYN packet indicating a TCP option; and modifying an address of the second ACK packet to contain an indication of the TCP option before sending the second ACK packet to the second computing node, the second ACK packet being in an Internet Protocol version 6 (IPv6) format.

10. The method of claim 4, wherein sending the second ACK packet to the second computing node comprises:

receiving, by the first intermediary computing node, a second SYN packet, the second SYN packet indicating a TCP option; and adding metadata to the second ACK packet to contain an indication of the TCP option before sending the second ACK packet to the second computing node.

11. A non-transitory computer-readable medium, bearing computer-readable instructions that, when executed on at least one computing node, cause the at least one computing node to perform operations comprising:

receiving, by a first intermediary computing node, an ACK packet as part of a Transmission Control Protocol (TCP) handshake with a computing node;

sending, by the first intermediary computing node, in response to receiving the ACK packet, an indication to a second intermediary computing node;

sending, by the second intermediary computing node, a SYN packet to a second computing node in response to receiving the indication, a source address of the SYN packet being based at least in part on a source address of at least one packet received as part of the TCP handshake;

receiving, by the second intermediary computing node, a SYN-ACK packet from the second computing node after sending the SYN packet to the second computing node;

sending, by the second intermediary computing node, a second ACK packet to the second computing node in response to receiving the SYN-ACK packet;

determining a first sequence number from the ACK packet, the first sequence number indicating a TCP sequence numbering scheme used by the first computing node;

determining a second sequence number from the SYN-ACK packet, the second sequence number indicating a TCP sequence numbering scheme used by the second computing node;

receiving a packet originated from the first computing node and destined for the second computing node;

converting the packet to the TCP sequence numbering scheme used by the second computing node based at least in part on the first sequence number and the second sequence number; and sending the converted packet to the second computing node.

12. The non-transitory computer-readable medium of claim 11, further bearing computer-readable instructions that, upon execution on the at least one computing node, cause the computing node to perform operations comprising:

determining a first sequence number from the ACK packet, the first sequence number indicating a TCP sequence numbering scheme used by the first computing node;

determining a second sequence number from the SYN-ACK packet, the second sequence number indicating a TCP sequence numbering scheme used by the second computing node;

receiving a packet originated from the second computing node and destined for the first computing node;

converting the packet to the TCP sequence numbering scheme used by the first computing node based at least in part on the first sequence number and the second sequence number; and sending the converted packet to the first computing node.

13. The non-transitory computer-readable medium of claim 11, further bearing computer-readable instructions that, upon execution on the at least one computing node, cause the computing node to perform operations comprising:

receiving, by the first intermediary computing node, a second SYN packet, the second SYN packet indicating a TCP option;

storing, by the first intermediary computing node, an indication of the TCP option between a time when the second SYN packet is received and a time when the second ACK packet is sent; and adding metadata to the second ACK packet to contain the indication of the TCP option before sending the second ACK packet to the second computing node.

14. The non-transitory computer-readable medium of claim 11, further bearing computer-readable instructions that, upon execution on the at least one computing node, cause the computing node to perform operations comprising:

receiving, by the first intermediary computing node, a second SYN packet, the second SYN packet indicating a TCP option; and adding an indication that the second ACK packet has been validated to the second ACK packet before sending the second ACK packet to the second computing node.

15. The non-transitory computer-readable medium of claim 11, further bearing computer-readable instructions that, upon execution on the at least one computing node, cause the computing node to perform operations comprising:

receiving, by the first intermediary computing node, a second SYN packet, the second SYN packet indicating a TCP option; and adding an indication of a rate of packets received by the first intermediary computing node that are directed to the second computing node to the second ACK packet before sending the second ACK packet to the second computing node.

16. The non-transitory computer-readable medium of claim 11, further bearing computer-readable instructions that, upon execution on the at least one computing node, cause the computing node to perform operations comprising:

receiving, by the first intermediary computing node, a second SYN packet, the second SYN packet indicating a TCP option; and adding an indication of an amount of trust associated with the computing node to the second ACK packet before sending the second ACK packet to the second computing node.

17. The non-transitory computer-readable medium of claim 11, further bearing computer-readable instructions that, upon execution on the at least one computing node, cause the computing node to perform operations comprising:

receiving, by the first intermediary computing node, a second SYN packet, the second SYN packet indicating a TCP option; and adding an indication of a numbering scheme used by the computing node to the second ACK packet before sending the second ACK packet to the second computing node.

18. The non-transitory computer-readable medium of claim 11, further bearing computer-readable instructions that, upon execution on the at least one computing node, cause the computing node to perform operations comprising:

receiving, by the first intermediary computing node, data from a third computing node, the first intermediary computing node using the data to generate a first sequence number as part of the TCP handshake with the computing node;

receiving, by the second computing node, the data from the third computing node, the second computing node using the data to generate the first sequence number as part of the SYN-ACK packet.

19. The non-transitory computer-readable medium of claim 11, further bearing computer-readable instructions that, upon execution on the at least one computing node, cause the computing node to perform operations comprising:

determining, by the first intermediary computing node, to send the ACK packet, in response to determining that a rate of SYN packets received by the first intermediary computing node and destined for the second computing node is above a threshold rate.

20. The non-transitory computer-readable medium of claim 11, further bearing computer-readable instructions that, upon execution on the at least one computing node, cause the computing node to perform operations comprising:

determining, by the first intermediary computing node, to send the ACK packet, in response to determining that the ACK packet is associated with a subset of SYN packets received by the first intermediary computing node and destined for the second computing node, a rate of SYN packets being received by the first intermediary computing node and destined for the second computing node being above a first threshold rate and below a second threshold rate.

21. The non-transitory computer-readable medium of claim 11, further bearing computer-readable instructions that, upon execution on the at least one computing node, cause the computing node to perform operations comprising:
  after sending the second ACK packet to the second computing node, determining that a rate of SYN packets being received by the first intermediary computing node and destined for the second computing node is below a first threshold rate;
  receiving, by the first intermediary computing node, a second SYN packet destined for the second computing node; and
  in response to determining that the rate of SYN packets being received by the first intermediary computing node and destined for the second computing node is below the first threshold rate, sending, by the first intermediary computing node, the second SYN packet to the second computing node.

22. The non-transitory computer-readable medium of claim 20, further bearing computer-readable instructions that, upon execution on the at least one computing node, cause the computing node to perform operations comprising:
  marking the SYN packet as being sent in response to receiving the ACK packet from the first intermediary computing node; and
  marking the second SYN packet as being passed through by the first intermediary computing node.

\* \* \* \* \*